(12) United States Patent
Mahajan et al.

(10) Patent No.: US 9,374,469 B2
(45) Date of Patent: Jun. 21, 2016

(54) VOICE OVER LONG TERM EVOLUTION-CALLED PARTY STATUS

(71) Applicant: CELLCO PARTNERSHIP, Basking Ridge, NJ (US)

(72) Inventors: Amit Mahajan, Bridgewater, NJ (US); Muhammad Salman Nomani, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 180 days.

(21) Appl. No.: 14/208,995

(22) Filed: Mar. 13, 2014

(65) Prior Publication Data

US 2015/0264182 A1   Sep. 17, 2015

(51) Int. Cl.
| | |
|---|---|
| H04M 11/10 | (2006.01) |
| H04M 3/54 | (2006.01) |
| H04M 3/533 | (2006.01) |
| H04W 4/16 | (2009.01) |

(52) U.S. Cl.
CPC .............. *H04M 3/54* (2013.01); *H04M 3/533* (2013.01); *H04M 3/53308* (2013.01); *H04W 4/16* (2013.01)

(58) Field of Classification Search
CPC ... H04M 3/54; H04M 3/533; H04M 3/53308; H04W 4/16
USPC .......... 455/416, 417, 445, 414.1; 379/220.01, 379/158, 202.01
See application file for complete search history.

(56) References Cited

U.S. PATENT DOCUMENTS

| | | | |
|---|---|---|---|
| 6,069,890 A | 5/2000 | White et al. | |
| 2010/0296643 A1* | 11/2010 | Athias | H04L 12/581 379/220.01 |
| 2011/0211531 A1* | 9/2011 | Woodson | H04W 8/18 370/328 |
| 2012/0216139 A1* | 8/2012 | Ording | G06F 3/0488 715/773 |
| 2013/0024574 A1 | 1/2013 | Lau et al. | |

\* cited by examiner

*Primary Examiner* — Wayne Cai

(57) ABSTRACT

Devices and methods are provided for implementing a network resource management system that reduces network signaling traffic through a network. A network server utilizing a communication signaling protocol is configured with functionality that reduces call set-up signaling traffic. Instead of exchanging communication signaling protocol related signaling between a calling end user device and a destination end user device when attempting to set up the call, the disclosed examples provide for determining a call status of the destination end user device before sending any communication signaling protocol related messages to the destination end user device. If the destination end user device is unavailable or is on another call, the network server uses communication signaling protocol related messages to connect the calling end user device with a voice mail server related to the destination end user device and foregoes sending communication signaling protocol related messages to the destination end user device.

20 Claims, 4 Drawing Sheets

100

200

VOICE OVER LONG TERM EVOLUTION-CALLED PARTY STATUS

BACKGROUND

The Internet Protocol (IP) multimedia subsystem (IMS), defined by the 3rd Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between two of the most successful communication paradigms, cellular and Internet technology, by providing Internet services everywhere using cellular technology in a more efficient way. Session Initiation Protocol (SIP) is the main protocol for IMS. IMS aims to ensure that IMS applications work consistently across different network infrastructures.

Current IMS SIP call flow systems provide serial and lengthy steps to setup or tear down a SIP session between caller A and called party B. These IMS SIP sessions can originate from an IMS-capable device and terminate at another IMS-capable device, a public switched telephone network (PSTN) or a non-IMS wireless device. SIP setup and/or tear-down processes typically flow serially, with IMS network elements sending each other similar and redundant SIP message commands. Examples of SIP message commands include INVITE, REFER, BYE and the like. In general, a SIP INVITE message is forwarded from an initiating end user device through to a recipient end user device. These similar and redundant SIP message commands increase the network traffic with a number of SIP message steps that are need to setup and teardown a SIP session. As a result, more network resources are occupied with the exchange of the similar and redundant SIP message commands.

In recent years, as the number of mobile devices using network resources increases, the need for additional network bandwidth has also increased. Different techniques have been suggested for optimizing the use of the available network resources and bandwidth including techniques for more efficiently managing processes that use the available bandwidth.

However, a need still exists for a system and method for effectively managing use of network resources to reduce the exchange of similar or redundant SIP commands.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples of devices and processes disclosed herein relate to network resource management in a communication signaling protocol system using an associated protocol to set-up a session between end user devices or the like for a call. A network element determines the status of a destination end user device prior to contacting the destination end user device, when attempting to establish a call between the destination end user device and a calling device. In response to the destination end user device call status indicating that the destination end user device is unavailable, the network element initiates a call with a voice mail server associated with the destination end user device. In this instance, the destination end user device is not contacted by a network element related to establishing a call because the destination end user device is unavailable, and to contact the destination end user device would be an inefficient use of network resources. As a result, an advantage of the disclosed examples is the efficient use of network resources by eliminating unnecessary exchanges of signaling protocol messaging.

Reference now is made in detail to the examples illustrated in the accompanying drawings and discussed below.

Figure 1:
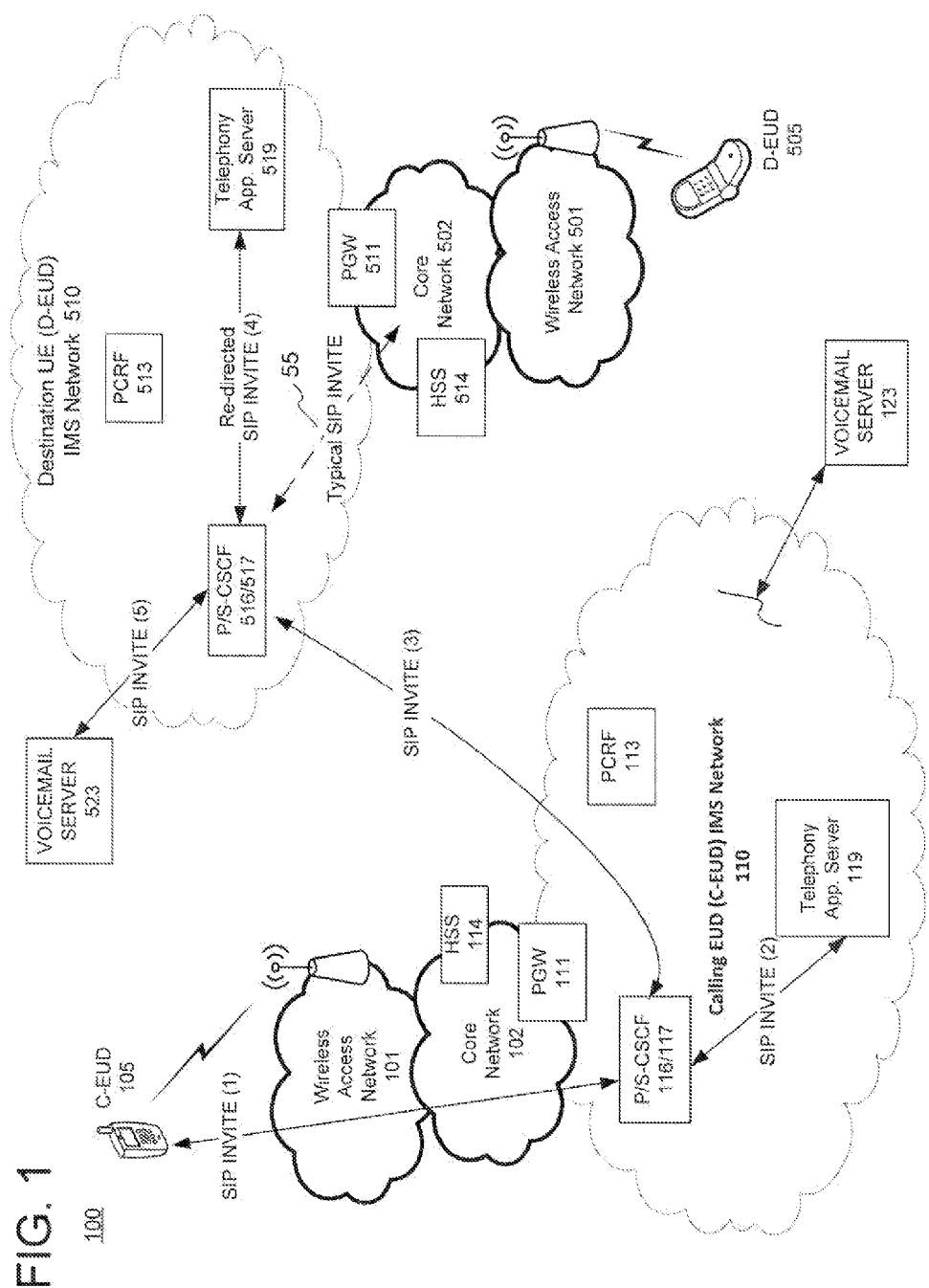
FIG. 1 is a high-level functional block diagram of an example of a system of communication devices and networks that provide connections between end user devices and support an example of the network resource management process.

A communication signaling protocol, for example, hypertext transport protocol (HTTP), simple mail transport protocol (STMP), real-time transport protocol (RTP) and session initiation protocol (SIP) is used in the establishment and control of sessions between multiple users that enable the multiple users to communicate with each other and with various network devices. The described examples may be used with any number of signaling communication protocols with messages that establish, terminate and other functions related to calls between devices. SIP is a signaling protocol utilized in IMS networks. Shown in FIG. 1 are various pathways for signaling messages that are sent back and forth between the end users and various hardware devices within the IMS networks, in this example, to set up a mobile device-to-mobile device call. Although, the techniques may be used for other types of user to user calls, e.g. video calls, the discussion concentrates mainly on voice call examples. A general description of these components and the signaling between these components will now follow, after which examples of call flows will be described in somewhat more detail.

FIG. 1 shows system 100 and signaling flow for a mobile call between end user devices (EUDs) 105 and 505. In general, EUDs 105 and 505 communicate with their respective wireless access networks 101 and 501 that have connections with respective core networks 102 and 502 that connect to other networks to provide signaling to establish voice and data connections with destination or recipient devices/systems. The wireless access networks 101 and 501, for example, may be cellular or Wi-Fi networks, and the core networks 102 and 502 may be packet data networks (PDN) or an evolved packet core (EPC). The wireless access networks 101 and 501 may be accessed via base stations, such as an eNodeB or the like (not shown). The core networks 102 and 502 may provide services such as a home subscriber server (HSS) 114 and 514, respectively, and a packet data gateway (PGW) 111 and 511, respectively. The HSS 114 and 514 may provide subscriber information related to the access to the respective networks

101, 102, 110, 501, 502 and 510. The other network elements may further facilitate session setup and provision of multimedia services to the calling end user device 105.

The communications in a communication signaling protocol from each of the respective wireless access networks 101, 501 and core network 102, 502 are passed to the respective IMS networks 110 and 510 through packet data network gateway (PGW) devices 111 and 511, respectively. The respective PGWs 111 and 511 act as interfaces between, for example, the respective core networks 102 and 502 and IMS networks 110 and 510. Also included in IMS core 110 are one or more servers, called call session control function (CSCF) servers that control the signaling between the calling end user device 105 via the respective IMS networks 110 and 510 to set-up a call with the destination end user device 505. The initial contact by a calling end user device 105 with the network 110 is through a proxy call session control function (P-CSCF) device 116 that acts as a SIP proxy server for network 110 and receives control signals from devices external to the network 110, such as the calling end user device 105. A serving call session control function (S-CSCF) device 117 acts as a point of control in the network 110 and provides a number of functions to control the sessions between the end user devices. For example, the S-CSCF 117 authenticates end user devices with the network 110 communicates with the charging functions to insure an end user device has proper permissions to access network services; serves to translate telephone numbers of end user devices to uniform resource identifiers (URI) for use in the network 110, keeps track of charges incurred by users when access data services; and other services. Network 510 similarly includes an S-CSCF 516, a P-CSCF 517, a PCRF 513 and a TAS 519.

The P-CSCF servers 116, 516 may serve as a first point of contact between a calling end user device 101, 505 and IMS core 110, 510. The P-CSCF servers 116, 516 may serve as an outbound/inbound SIP proxy server, where requests initiated by the calling end user device 105, 505 may traverse to P-CSCF server 116, 516, respectively. For example, when attempting to establish a call session using a communication signaling protocol, such as SIP, the P-CSCF 116 is typically the first point of contact in the IMS network, such as IMS core 110 that receives, for example, a voice over packet protocol message (e.g., a SIP INVITE message). The P-CSCF 116 then utilizes the S-CSCF in its own network (in this example, S-CSCF 117) to locate the S-CSCF in the destination devices network (i.e. S-CSCF 517).

The S-CSCF server 117, 517 may include a communication signaling protocol (e.g., SIP) server that serves as a central node in the communication signaling protocol signaling plane. The S-CSCF server 117, 517 may perform session control. Another network element incorporated into the P/S-CSCF 116, 516 may be an interrogating call session control function (I-CSCF) server (not shown), which may include a communication signaling protocol server that may be located at an edge of an administrative domain. The I-CSCF server may publish its IP address in the Domain Name System (DNS) record of the domain in which the I-CSCF resides so that remote servers can find the I-CSCF and use the I-CSCF as a forwarding point for communication signaling protocol packets in the domain. In addition to communication signaling protocol proxy functionality, the I-CSCF may include an interface to the HSS (another of network elements 114, 514) to retrieve user information and to route messages to an appropriate destination (e.g., S-CSCF 117, 517).

Another network element may be a communication signaling protocol telephony application server (TAS) 119, 519 that provides applications for use by a mobile device. The TASs 119 and 519 provides services through applications related to signaling and media distribution. For example, signaling refers to resolving routing related to free calls, resolving telephone number translations that allow for telephone number portability and the like, while media distribution refers to establishing voice and video calling, conference calling and similar services. Yet another network element is a policy control and charging rules function (PCRF) device 113, 513 that is configured to control the establishment/charging of resources within IMS core 110, 510. The communication signaling protocol TAS 119, 519 may include a communication signaling protocol entity that hosts and executes services, and interfaces with the S-CSCF 117, 517. The HSS 114, 514 may include a master user database that supports IMS network 110, 510 respectively and contains subscription-related information. The HSS 114, 514 may perform authentication and authorization of users and can provide information about a subscriber's location and IP information. As a call request message generated by a calling party is transmitted from one network element to another network element for subsequent delivery to a destination party, the call request message may be updated by the respective network element to include a custom header. The custom header may include information that identifies the respective network element, provides instructions for a subsequent network element, causes the respective network element to take an action based on the information, or the like. For ease of explanation and discussion, the call request will be referred to in terms of SIP messages. For example, a call request message in the SIP protocol, a SIP INVITE message, may have a custom header directed to another device or service in the network that receives SIP messages.

The call request also includes information based on the session description parameters (SDP) that indicate the media capabilities, such as audio format, audio codec and the like, of the calling party. The parameters in the SDP are maintained throughout the processing of the call request (e.g., SIP INVITE) message as it traverses through the network. Maintaining the SDP ensures the calling party device is provided service according to the capabilities indicated by the SDP. For example, an audio media path is established between the calling device and an ultimate destination, whether that is the destination end user device that the calling end user device intended to call or if it is a voice mail service associated with the destination device. The audio media path has to conform to the capabilities of the calling device. Accordingly, the SDP remains the same as the call request (e.g., SIP INVITE message) is passed from one network element to another until the call request arrives at the ultimate destination device. In the present examples, the ultimate destination device may be either the destination device or the voice mail server associated with the destination device.

In the following described examples, EUD 105 will be referred to as the calling EUD (i.e., C-EUD), which means that C-EUD 105 will be attempting to make a call to another EUD, which in the following examples is EUD 505. EUD 505 will be referred to as the destination EUD (i.e., D-EUD) 505. Of course, in other examples, the labels of calling EUD (C-EUD) and destination EUD (D-EUD) could be reversed. In other words, the designation of an EUD as a calling EUD or a destination EUD is arbitrary, and is used in the present disclosure for ease of explanation.

Although communication signaling protocol, such as SIP, calls may be made from an EUD operating in a packet (e.g., SIP capable) network to a device in a non-packet/non-SIP network, or to an EUD operating in a packet (e.g., SIP capable) network from a device in a non-packet/non-SIP network, for discussion purposes, examples will be described in which the origination and destination EUDs both support SIP and are both operating via SIP capable wireless network(s). Although, the two EUDs may be operating in the same network in the example of FIG. 1, they are shown operating in two different networks.

It is noted that although FIG. 1 shows these specific devices within the specific networks, that in different examples, different hardware devices may or may not be included within each network. It is also understood that although EUDs 105 and 505 are shown as mobile devices, these may include any devices capable of network communications. For example, they may include a corded or cordless telephone, cellphone, Smart phone, laptop computer, tablet computer, desk top computer or another type of computing or communications device. Each of the EUDs may also have separate identifying (e.g., telephone) numbers and is able to connect to one or more networks which may have different access technologies.

Networks 110 and 510 may include any type of network or combination of networks such as LAN, WLAN, WAN, WWAN, etc. Each of networks 110 and 510 may be capable of providing a variety of communication network services, such as registration services, authentication services, authorization services, call session control services and other types of communication services. Specifically, these networks may be configured to include IMS networks. The networks 110 and 510 may communicate with one another through various network components.

With reference to FIG. 1, C-EUD 105 when attempting to call D-EUD 505 may first communicate with the cellular network 101 to which the C-EUD 105 subscribes. One or more initial signals, for example, a SIP INVITE message, may be sent from the C-EUD 105 to the cellular network 101, which forwards the signals to the core network 102. The cellular network 101 and core network 102 may, for purposes of discussion, be collectively implemented using a 4G long term evolution (LTE) network. The signals are forwarded by the core network 102 to PGW 111. In general, PGW 111 provides an interface between the C-EUD 105 via the LTE network (i.e., cellular network 101 and core network 102) and the IMS network 101. Similarly, PGW 511 provides an interface between the LTE network (i.e., cellular network 501 and PDN 502) of D-EUD 505 and IMS network 510.

It should be noted that the various devices shown in FIG. 1, such as PGW 111, PGW 511, P-CSCF 116, S-CSCF 117, TAS 119, TAS 519, S-CSCF 516, P-CSCF 517, PCRF 113, PCRF 513 may include one or more of a variety of routing, computing and storage devices such as a router, a computer, a memory, a server, a cluster of servers or one or more of other types of computing or communication devices. In general, the respective PGWs 111 and 511 use the P-CSCF 116 and 516, respectively, as an access point to either IMS network 110 or 510. Each P-CSCF 116 or 516 acts as a proxy server for the C-EUD 105 or D-EUD 505, respectively. The S-CSCF 117 and 517 provide points of control in the respective IMS networks 110, 510 that enable control of all service delivery and control of all sessions.

The TAS 119 and 519 provide telephony services that are not directly related to routing user traffic packets through the network messages. For example, the TASs 119, 519 may provide services such as call waiting, call forwarding, call conferencing and other types of services. In addition, the TASs 119 and 519 are configured to perform functions, such as media management, call routing number portability and the like, related to the efficient management of network resources that are described in more detail below with respect to specific examples. For example, the respective TASs 119 and 519 control signaling related to establishing connections between EUDs and the respective networks 101, 510 voice mail servers 123, 523. The voice mail servers 123, 523 are specialized computers that answer a received call intended for a destination EUD and store a message from the caller in digital form, so the user associated with the intended destination EUD can later retrieve the message. For example, the respective voice mail servers 123, 523 provide voice mail services, such as a voice mail box, and additional functionality, such as voice mail box management, ringtone selection, call back services and the like, to EUDs that subscribe to services on a system (e.g., cellular communication network) serviced by the respective voice mail server 123, 523. For example, voice mail server 523 provides voice mail and additional functionality to D-EUD 505, while voice mail server 123 provides voice mail and additional functionality to C-EUD 105.

The PCRFs 113 and 513 allow policy control decisions and signal flow based charging control functionalities to be accessed by P-CSCF 116 and P-CSCF 516, respectively, with regard to the C-EUD 105 and the D-EUD 505. In an implementation, the C-EUD 105 user intends to contact a user of D-EUD 505 by inputting a telephone number assigned to the D-EUD 505 into an input device of the C-EUD 105. In response, the C-EUD 105 device generates a call request, such as SIP INVITE (1),) message. The SIP INVITE (1) message includes the address of the destination device D-EUD 505 that is transmitted by the C-EUD 105 via the wireless access network 101, the core network 102 and the PGW 111 to the P-CSCF 116 within the IMS network 110. The P-CSCF 116 exchanges signaling with the S-CSCF 117 to determine an address of the D-EUD 505. Upon receipt of the address of the D-EUD 505, which is in IMS network 510, the S-CSCF 117 forwards SIP INVITE (2) message to the TAS 119. S-CSCF 117 forwards SIP INVITE (2) message to the TAS 119 TAS 119 sends the SIP INVITE (2) back to S-CSCF 117 and from there the SIP INVITE (3) goes to the S-CSCF 517. S-CSCF 517 then sends this SIP INVITE (4) to TAS 519 to reach the D-EUD 505. In a typical implementation as shown by the "Typical SIP INVITE" message 55, a typical SIP INVITE message 55 is forwarded from the P/S-CSCF 516/517 through the PGW 511 to the core network 502, which may further process the message, for example, consult the HSS 514 to locate the D-EUD 505. After any core network 502 processing, during a typical operation, the call request message, such as "Typical SIP INVITE," may be forwarded through the wireless access network 501 and be delivered to the D-EUD 505 even if the D-EUD 505 is unavailable to receive a call, which consumes network resources for the mere purpose of exchanging communication signaling protocol messages as explained above. In other words, a normal network path for a call request is, for example, the communication path through the various network and inter-network components that the call request from C-EUD 105 traverses to be delivered to D-EUD 505. As a result, network resources are consumed for the mere exchange of call set-up signals, and not an actual call.

Figure 2:
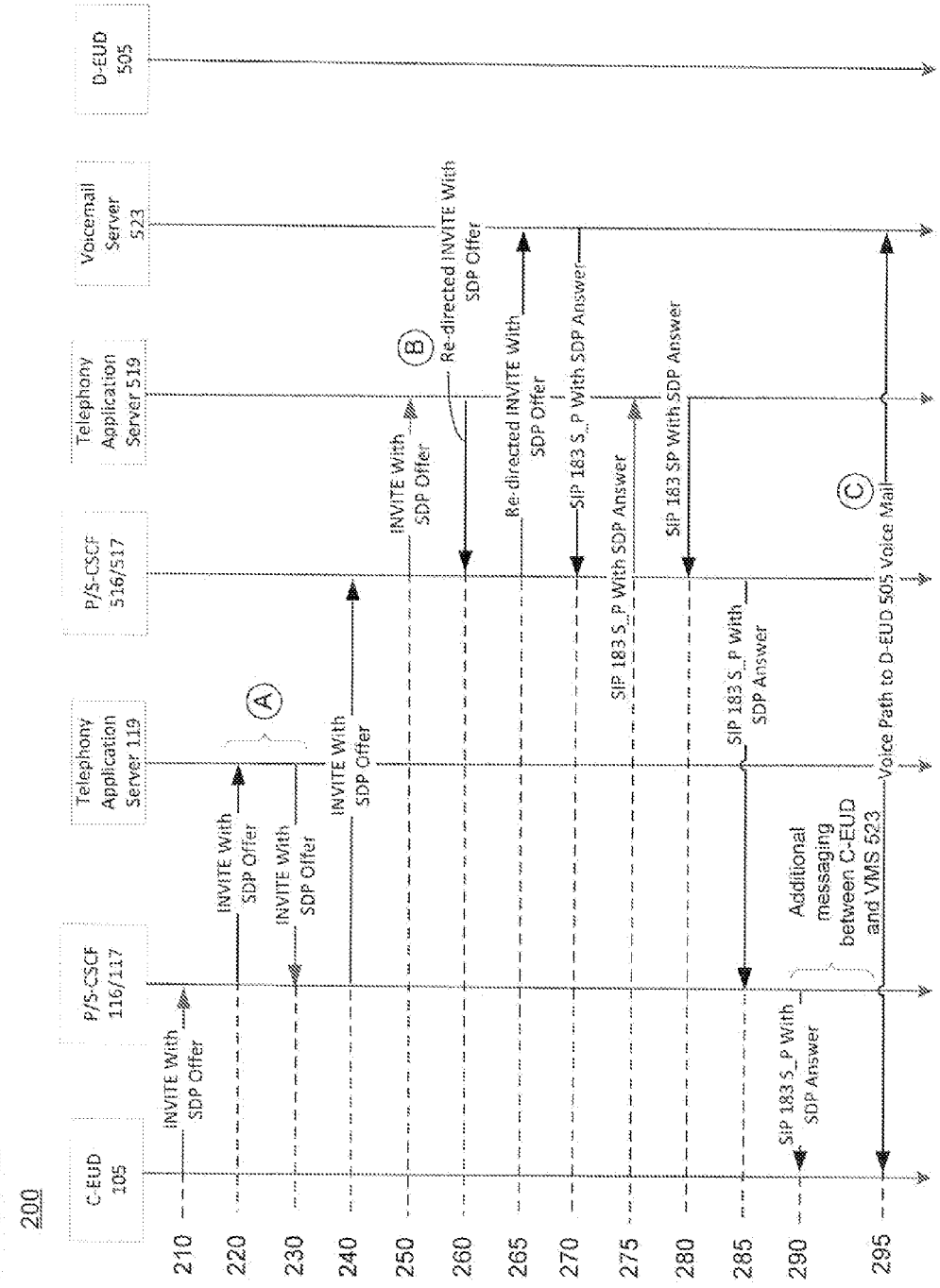
FIG. 2 is a high-level call flow providing an example of a network resource management process.

In contrast to the typical implementation, the disclosed examples provide an alternative in which the SIP INVITE (4) message is re-directed by TAS 519 via the P/S-CSCF 516/517 to VMS 523 instead of to the D-EUD 505. The re-directed SIP INVITE (4) contains the SDP offer from the C-EUD 105 as well as customized header information based on a determined call status of the destination device. In operation, the TAS 519 determines a call status (e.g., destination device is available to receive a call, or unavailable, such as the destination device is powered OFF or not registered with the network or currently on a call but unavailable or powered OFF) of D-EUD 505. For example, a device may be on a call and still be unavailable if there is another call on hold or the device preferences indicate that only one call at a time can be accepted, or the like) of D-EUD 505. If the TAS 519 determines the D-EUD 505 is unavailable, the TAS 519 also generates and forwards a re-directed SIP INVITE (4) message to the P/S-CSCF 516/517, which forwards the re-directed SIP INVITE (4) as SIP INVITE (5) to the voice mail server (VMS) 523 that provides voice mail services to the D-EUD 505. This avoids the consumption of network resources in not only the IMS network 510, but also in the core network 502 and wireless access network 501. The disclosed examples provide a methodology and devices that conserve network resources and associated with connecting to a voice mail box of an unavailable end user device. For example, FIG. 2 illustrates a call request flow of a communication signaling protocol, such as a SIP INVITE with session description parameters (SDP) request message, according to the disclosed examples. SDP may include information indicating the capabilities of the C-EUD 105 such as, for example, the type of audio codec, audio compression, audio formats and the like. The SDP facilitates the successful completion of a call between a calling end user device and a destination end user device.

The call request flow 200 begins with the C-EUD 105 generating a call request message, such as communication signaling protocol SIP INVITE with SDP request message, that is sent to session control (i.e., P/S-CSCF) 116/117 in network 110 (210). The SIP INVITE with SDP request message may include a telephone number of the destination device (i.e. D-EUD 505). To insure that the SIP INVITE with SDP request message is properly routed, the session control provided by P/S-CSCF 116/117 identifies the session control function of the network servicing the D-EUD 505. In step 220, P/S-CSCF 116/117 forwards the SIP INVITE with SDP request message to TAS 119. The TAS 119 assists the session control 116/117 by determining a correct routing for the forwarded SIP INVITE with SDP request message. The TAS 119, for example, may have access to a database or other server that contains an address of the session control function of the network servicing the D-EUD 505. At A of FIG. 2, the TAS 119 extracts the telephone number of D-EUD 505 from the forwarded SIP INVITE with SDP call request message, and using the extracted D-EUD 505 telephone number accesses the database to obtain, or provides the parsed number to a service that obtains, an address of the D-EUD 505. For example, the TAS 119 may, upon obtaining the address of the D-EUD 505, return for example, an address for P/S-CSCF 516/517 in IMS network 510 to the P/S-CSCF 116/117 (230). Using the address of the P/S-CSCF 516/517 provided by the TAS 119, the P/S-CSCF 116/117, in 240, sends the SIP INVITE request message to the P/S-CSCF 516/517 in IMS network 510. Similar to the P/S-CSCF 116/117, the P/S-CSCF 516/517 needs to identify the end user device to which the SIP INVITE request message is addressed. To obtain the end user device address (e.g. telephone number); the P/S-CSCF 516/517 forwards the SIP INVITE with SDP request message to the TAS 519 of IMS network 510, at 250.

The TAS 519 receives the SIP INVITE with SDP request message from the C-EUD 105 to call to the destination end user device via the communication signaling protocol (250). The SIP INVITE with SDP call request message may include a telephone number associated with the D-EUD 505, however, the network may use another identifier related to the D-EUD 505 because the telephone number may have been ported from another network or associated with a service that utilized end user device addressing different from a typical telephone number.

At B, the TAS 519 processes the received SIP INVITE with SDP request message. The TAS 519 process is explained with reference to FIG. 3. The TAS process 300 begins with receipt of the SIP INVITE with SDP call request message from the C-EUD 105 at 310. Based on the received SIP INVITE with SDP call request message, the TAS 519 identifies the destination end user device, in this case, D-EUD 505, that the calling end user device is requesting to call (320). In order to identify the destination end user device, the TS 519 extracts data from the received SIP INVITE with SDP call request message. For example, the received SIP INVITE with SDP call request message may include a telephone number of the destination end user device, or some other address related to the destination end user device, that the C-EUD 105 is attempting to call. In an example, the TAS 519 may access a database containing a list of telephone numbers associated with EUDs that are registered with the IMS network. Alternatively, the TAS 519 may enlist a service (e.g. an application that sends queries to the HSS 514 or other network element) to obtain information that would identify the destination EUD.

Using the obtained identifying information of the destination end user device and prior to initiating the call to the destination end user device, the TAS 519 may determine a call status of the destination end user device (330). For example, the TAS 519 may have identified the destination end user device as D-EUD 505. The TAS 519 has access to call status information for end user devices, such as D-EUD 505, registered with the network 510. The TAS 519, for example, may access and analyze a database to determine the call status of the identified destination end user device. At 330, the call status determination inquiry may be whether the D-EUD 505 is currently available.

A destination device is determined to be available if the destination device is not on a call. Conversely, a destination device is determined to be unavailable when the destination device is on a single call (e.g., an active call), multiple calls (i.e., one active call with another calling party on hold), not registered with the network, has been suspended (e.g., reached a minutes limit), turned "Off" or the like. In a specific example, the TAS 519 may determine that D-EUD 505 is on an active call and has another call on hold. In which case, the TAS 519 may determine that the D-EUD 505 is unavailable to the calling party.

If the call status determination, at 330, is "YES, the D-EUD 505 is currently available," the process 300 proceeds to step 333 and performs normal or standard process steps for connecting a calling party to a destination party. At step 333, the TAS 519 initiates a communication signaling protocol session between C-EUD 105 and the D-EUD 505 according to present operating procedures performed by TAS 519. After which, the process 300 ends.

However, if the call status determination, at 330, is "No, the D-EUD is currently unavailable," the process 300 proceeds to step 340.

At 340, in response to the determined call status indicating that the D-EUD 505 is currently unavailable, a determination is made whether D-EUD 505 is presently on a call with only a single call. For example, if the D-EUD 505 is only connected to one other calling party on a call. The TAS 519 generates a re-directed SIP INVITE with SDP message to respond to the SIP INVITE with SDP call request received from the C-EUD 105. Since the SIP standard allows for the appending of customized headers to the SIP INVITE message, the TAS 519 when generating the re-directed SIP INVITE message may append a customized header to the SIP INVITE message to indicate to the VMS 523 that the caller is on an active call. For example, the TAS 519 may add a customized header that may have a format, such as P-Voicemail-Option or the like. For example, the P-Voicemail-Option customized header may contain a bit or flag that is set to indicate that the TAS 519 further determines whether the D-EUD 505 is on a single call. In other words, the TAS 519 analyzes the database to determine whether the D-EUD 505 is on an active call with only one calling party and has no calling party or parties on hold.

In response to the determination that the D-EUD 505 is not on a single call only (i.e., a "NO" response), the process 300 proceeds to 343. At 343, the TAS 519 connects the C-EUD 105 to the VMS 523 so the C-EUD 105 may leave a voicemail message for the D-EUD 505. Alternatively, the re-directed SIP INVITE message is generated by the TAS 519 without signaling the D-EUD 505 in response to the received SIP INVITE request from the C-EUD 105. As a result, the re-directed SIP INVITE message includes additional information related to a call status of the destination end user device. For example, the SIP INVITE request sent from the C-EUD 105 may include an identifier of the D-EUD 505, an identifier of the C-EUD 105, network owner information, network version identifier, and the like. In contrast, the re-directed SIP INVITE message may include customized header information, original SDP of the C-EUD 105, an identifier of the C-EUD 105.

After generating the re-directed SIP INVITE message at 350, the TAS 519 causes the re-directed SIP INVITE message to be forwarded to a voice mail server (VMS), such as VMS 523, associated with the D-EUD 505 (360).

The process 300 continues and the TAS 519 initiates a connection (i.e. call) between the C-EUD 105 and the VMS associated with the D-EUD (i.e., VMS 523) (370). When initiating the connection between the C-EUD 105 and the VMS 523, the VMS 523 generates a message, such as a SIP 183 Session Progress (S_P) with SDP Answer message directed to the C-EUD 105 (380). Upon connection between the C-EUD 105 and the VMS 523, the C-EUD 105 is informed, via, for example, an audio message prompt or a menu prompt presented on a display device of the C-EUD 105, that the user of the D-EUD 505 is on another call, and that the user of C-EUD 105 can select from one or more options. For example, the informing prompt may present options for selection by the C-EUD 105 of leaving a voicemail message for the D-EUD 505, continue attempting to reach (i.e. connect with) the D-EUD 505, or hang-up (i.e., disconnect the call). The process 300, depending upon the selected option, performs an action. For example, if the C-EUD 105 selects "leaving a voicemail." the process 300 proceeds from 395 to 343, in which case, the user of C-EUD 105 may leave a voicemail message for D-EUD 505, and after which the process 300 ends. Alternatively, if the selected option is to "Hang-up," the process 300 ends. If the selected option is to "Continue reaching D-EUD," the process 300 proceeds to step 333, in which a communication signaling protocol is initiated between C-EUD and D-EUD, and after which the process 300 ends.

At this point, returning to FIG. 2, which illustrates the call flow when the D-EUD 505 is unavailable, the call flow 270 of FIG. 2 shows the SIP 183 S_P with SDP Answer message being forwarded (at step 380 of FIG. 3) from the VMS 523 to the P/S-CSCF 516/517. The SIP 183 S_P with SDP ANSWER message includes a VMS 523 destination address to be delivered to the C-EUD 105. This SIP 183 S_P with SDP Answer message is routed back to C-EUD 105 as shown in FIG. 2 and explained in more detail below. Using the determined SDPs, (e.g., a SDP offer from C-EUD 105 and SDP answer from VMS), a call between the C-EUD 105 and a voice mail box managed by the VMS 523 associated with the D-EUD 505 is established. For example, at 280, the TAS 519 returns at least the address or identity of the P/S-CSCF 116/117 and the SIP 183 S_P with SDP ANSWER message to the P/S-CSCF 516/517, which is forwarded (at 285) to the P/S-CSCF 116/117. The P/S-CSCF 116/117 forwards the SIP 183 S_P with SDP ANSWER message to the C-EUD 105. In response, the C-EUD 105 may exchange additional messages (e.g. acknowledgement messages, such as a PRACK/200 OK messages) with the VMS 523 via the components in the communication path (e.g. session control 116/117, session control 516/517 and the like). Upon completion of the exchange of additional messaging, the voice path from the C-EUD 105 to the voice mail box of D-EUD) 505 hosted by the VMS 523 is established (295). The voice data exchanged between the C-EUD 105 and the VMS 523 is exchanged using a voice over IP (VoIP) packet protocol.

With the voice path established, as described above, the VMS 523 may present to the C-EUD 105 a voice message (See step 390 of FIG. 3), for example, stating "the party you are attempting to call is busy right now. You may continue to try to reach the party, leave a message, or try again later" or similar language. Based on the response input (e.g. a voice input via voice recognition), a keypad input (which may generate dual-tone multi-frequency tones), a touch input, gesture input or the like) by the C-EUD 105 user at 395, the VMS 523 performs the requested function.

Figure 3:
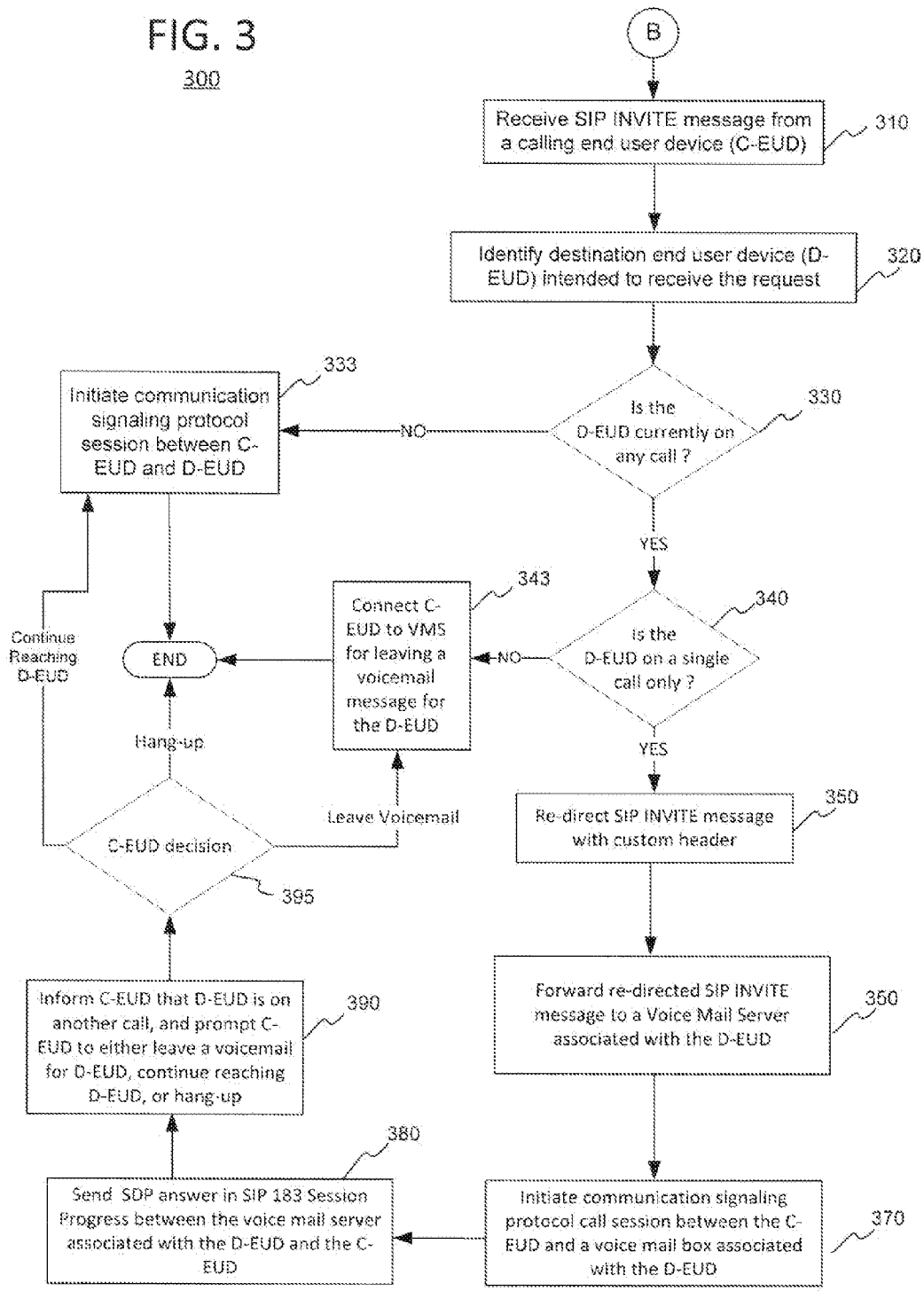
FIG. 3 is a flow chart of an example of a process implemented in the system illustrated in FIG. 1.

For example, if the C-EUD 105 indicates that the user wants to leave a voice mail message of the D-EUD 505 user, the VMS 523 will allow the C-EUD 105 user to record a message in the identified D-EUD 505 voice mail box (See step 343 of FIG. 3). Alternatively, if the C-EUD 105 indicates that the user desires to continue to attempt to contact the D-EUD 505. In addition, if the C-EUD 105 indicates that the user would like to continue to try to connect with the D-EUD 505, the VMS 523 may be optionally configured to respond with a personal ringtone of the D-EUD 505 while attempting to connect C-EUD 105 with D-EUD 505 (See step 333 of FIG. 3). In other words, in response to requesting that the VMS 523 continue to connect with the D-EUD 505, the user of the C-EUD 105 hears a generic ringback tone or a personal ringtone associated with the D-EUD 505. Or, the C-EUD 105 may disconnect or hang-up (and the process ENDs).

In another example, the C-EUD 105 and the D-EUD 505 may be serviced by the same IMS core, such as IMS core 110. In which case, the same TAS 119 will handle the tasks described above that were handled by TAS 519. Similarly, the signal routing performed by the P/S-CSCF 516/517 will only be performed by the P/S-CSCF 116/117 of the IMS core 110. And, instead of VMS 523 being connected to the C-EUD 105, VMS 123 will be connected to C-EUD 105.

Hence, the disclosed examples provide for a method and device for reducing the number of signaling messages to be exchanged with a destination end user device that is unavailable for a call. As a result, network resources are conserved, and potential latencies with completing redirection of calls from unavailable devices to voicemail are reduced by determining a call status of the destination end user device prior to completing the communication session signaling to the destination end user device.

Figure 4:
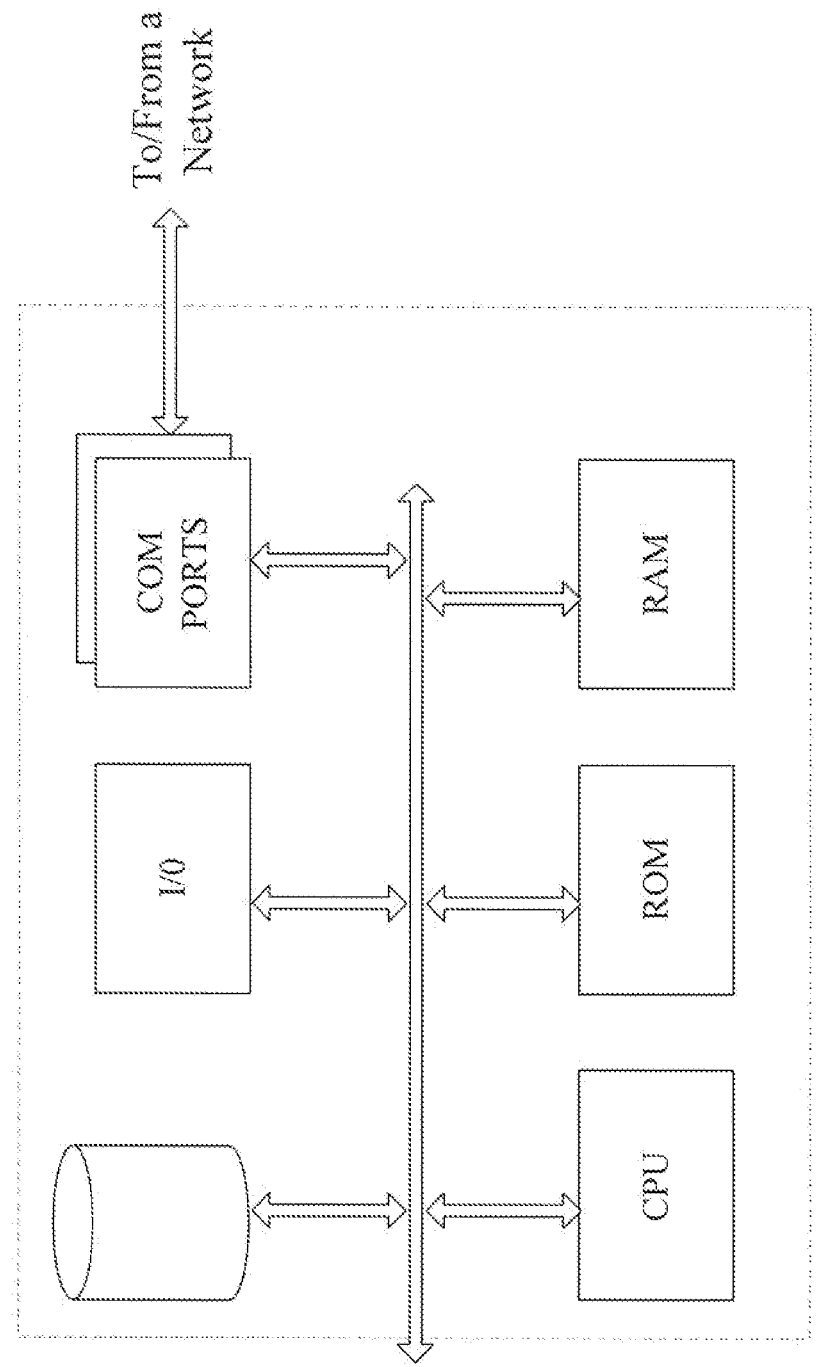
FIG. 4 is a simplified functional block diagram of a computer that may be configured as a host or server, for example, to function as a telephony application server or voice mail server in the system of FIG. 1.

If D-EUD 505 has enabled call forwarding to another number, then the TAS 519 will apply the same logic as above to the forwarded number instead of D-EUD 505. In other words, the call status determination described above is also performed for the call forwarded destination. FIG. 4 provides a functional block diagram illustration of a general purpose computer hardware platform. FIG. 4 illustrates a network or host computer platform, as may typically be used to implement a server, such as a TAS 119 or 519 or a VMS 123 or 523. It is believed that the general structure and general operation of such equipment as shown in FIG. 4 should be self-explanatory from the high-level illustration.

A server, for example, such as either TAS 119, 519 or VMS 123, 523, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In a specific example, the VMS 523 may cause a menu to be presented on an end user device presenting choices for interacting with a voice mail box to: 1) continue calling destination EUD; 2) select to leave a voice mail message for the destination EUD; or 3) hang up to try to call again. Personal ring back tones are also available in which the network allows a user to have different ringtones for different EUDs. In other words, when a particular calling EUD is calling a destination EUD, the destination EUD may have a ringtone assigned for the particular calling EUD. In which case, the calling EUD will hear the particular ringtone that the destination EUD) has assigned to the calling EUD. The VMS knows via the destination EUD preferences that the personal ringtone is to be used for the particular C-EUD.

Hence, aspects of the methods of network resource management outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the IMS network provider into the computer platform of the service provider that will be the telephony application server or voice mail server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the network resource management, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 110, or 510 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method executed by a telephony application server serving a destination end user device, comprising:
   receiving, by the telephony application server, a call request from a calling end user device to initiate a call to the destination end user device via a communication signaling protocol;
   based on the received call request, identifying, by the telephony application server, the destination end user device that the calling end user device is requesting to call;
   determining, by the telephony application server, a call status of the destination end user device prior to initiating the call to the destination end user device; and
   in response to the call status indicating that the destination end user device is currently on another call:
      redirecting, by the telephony application server, the call request from its normal network path;
      modifying, by the telephony application server, the call request by incorporating an indication of the destination end user device call status into a customized header to provide a re-directed call request;
      forwarding, by the telephony application server, the re-directed call request to a voice mail server associated with the destination end user device; and
      based on a response to the indication of the destination end user device call status in the customized header, presenting, by the telephony application server, a voicemail option on the calling end user device.

2. The method of claim 1, wherein the re-directed call request is modified and forwarded to the voice mail server without signaling the destination end user device in response to the received call request from the calling end user device.

3. The method of claim 1, wherein the customized header contains information indicating whether the voice mail server is to present an optional voicemail message to the calling end user device.

4. The method of claim 1, further comprising:
   parsing the customized header in the re-directed call request by the voice mail server to determine the indication of the destination end user device call status.

5. The method of claim 1, further comprising:
   sending session description parameters, for setting up a voice over packet call connection between the voice mail server associated with the destination end user device and the calling end user device, to a server associated with the calling end user device.

6. The method of claim 1, wherein the call request is a Session Initiation Protocol INVITE message.

7. The method of claim 1, wherein the call status indicates that the destination end user device is currently on a single other call.

8. A server comprising:
   a processor;
   a non-transitory machine-readable storage medium; and
   programming embodied in the non-transitory machine readable storage medium for execution by the processor, wherein execution of the programming by the processor configures the server to perform functions, including functions to:
      receive a call request from a calling end user device to initiate a call to a destination end user device;
      based on the received call request, identify the destination end user device that the calling end user device is requesting to call;
      determine a call status of the destination end user device prior to initiating the call to the destination end user device by analyzing a database; and
      in response to the call status indicating that the destination end user device is currently unavailable:
         redirect the call request from its normal network path;
         modify the call request by incorporating an indication of the call status into a customized header to provide a re-directed call request;
         forward the re-directed call request to a voice mail server associated with the destination end user device; and
         based on a response to the indication of the destination end user device call status into the customized header, presenting a voicemail option on the calling end user device.

9. The server of claim 8, wherein the re-directed call request is modified and forwarded to the voice mail server without signaling the destination end user device in response to the received call request from the calling end user device.

10. The server of claim 8, wherein the customized header contains information indicating whether the voice mail server is to present an optional voicemail message to the calling end user device.

11. The server of claim 8, further comprising programming embodied in the non-transitory machine readable storage medium for execution by the processor, wherein the execution of the programming by the processor configures the server to perform functions, including functions to:
   parse the customized header in the re-directed call request, to determine the indication of the destination end user device call status.

12. The server of claim 8, wherein the programming embodied in the non-transitory machine readable storage medium for execution by the processor, wherein execution of the programming by the processor configures the server to perform functions, including functions to:
   send session description parameters, for setting up a voice over packet call connection between the voice mail server associated with the destination end user device and the calling end user device, to a server associated with the calling end user device.

13. The server of claim 8, wherein the call request is a Session Initiation Protocol INVITE message.

14. The server of claim 8, wherein the call status indicates that the destination end user device is currently on a single other call.

15. A non-transitory computer-readable medium storing instructions, the instructions comprising:
- one or more instructions which, when executed by a processor of a telephony application server, cause the processor to:
  - receive a call request from a calling user device to initiate a call to a destination user device via a communication signaling protocol;
  - identify, based on the call request, the destination user device that the calling user device is requesting to call;
  - determine a call status of the destination user device prior to initiating the call to the destination user device; and
  - in response to the call status indicating that the destination user device is currently on another call:
    - redirect the call request from a determined network path;
    - modify the call request by incorporating an indication of the destination user device call status into a customized header to provide a re-directed call request;
    - forward the re-directed call request to a voice mail server associated with the destination user device; and
    - present, based on a response to the indication of the destination user device call status in the customized header, a voicemail option on the calling user device.

16. The non-transitory computer-readable medium of claim 15, wherein the re-directed call request is modified and forwarded to the voice mail server without signaling the destination user device.

17. The non-transitory computer-readable medium of claim 15, wherein the customized header includes information indicating whether the voice mail server is to present an optional voicemail message to the calling user device.

18. The non-transitory computer-readable medium of claim 15, further comprising:
- one or more instructions which, when executed by the processor, cause the processor to:
  - parse the customized header in the re-directed call request to determine the indication of the destination user device call status.

19. The non-transitory computer-readable medium of claim 15, further comprising:
- one or more instructions which, when executed by the processor, cause the processor to:
  - send session description parameters, for setting up a voice over packet call connection between the voice mail server and the calling user device, to a server associated with the calling user device.

20. The non-transitory computer-readable medium of claim 15, wherein the call request is a Session Initiation Protocol INVITE message.

\* \* \* \* \*